United States Patent [19]

Swindall et al.

[11] Patent Number: 4,674,327
[45] Date of Patent: Jun. 23, 1987

[54] GRADE AND CROSS FALL REFERENCE DEVICE FOR HIGHWAY SURVEY VEHICLES

[75] Inventors: William S. Swindall, Ayr; Brian R. Campbell, St. George; Donald H. Kobi, Paris, all of Canada

[73] Assignee: Highway Products International Inc., Paris, Canada

[21] Appl. No.: 840,041

[22] Filed: Mar. 17, 1986

[51] Int. Cl.$^4$ .......................... G01B 5/28; G01C 23/00
[52] U.S. Cl. ...................................... 73/146; 73/178 R
[58] Field of Search ...................... 73/146, 105, 178 R; 33/356; 364/571, 447, 453, 454, 443

[56] References Cited

U.S. PATENT DOCUMENTS

| | | | |
|---|---|---|---|
| 1,837,609 | 12/1929 | Carter | 73/491 |
| 3,151,235 | 9/1964 | Greenshields | 73/105 |
| 3,983,746 | 10/1976 | Phillips et al. | 73/105 |
| 4,024,539 | 5/1977 | Quinlivan et al. | 343/11 R |

*Primary Examiner*—Donald O. Woodiel
*Attorney, Agent, or Firm*—Ridout & Maybee

[57] ABSTRACT

In a highway survey vehicle, grade and cross fall measurements are made in relation to references established by a displacement type pitch and roll gyroscope with a gravity referenced erection system. Lateral acceleration of the vehicle is calculated independently and used to provide a correction for errors caused by spurious erection induced by such lateral acceleration, provided that such acceleration falls within certain limits such as to permit effective correction. The lateral acceleration may be calculated from measured rates of displacement and change of the direction of the vehicle.

9 Claims, 4 Drawing Figures

GRADE AND CROSS FALL REFERENCE DEVICE FOR HIGHWAY SURVEY VEHICLES

This invention relates to mobile highway survey systems.

In the maintenance of highways, it is necessary to be able to assess the condition of highways and their conformity to defined standards of smoothness, structural integrity and geometry in order to determine the necessity for maintenance, repair or improvement. Traditionally such assessment was carried out by a combination of human judgement based on visual inspection and subjective impressions of ride quality, combined with static surveys which are time consuming and expensive. There has consequently been a desire to develop equipment capable of taking continuous or rapidly repeated measurements of various types from a moving vehicle. One class of measurements which is particularly important in planning maintenance programs is road profile. Since the existing profile of a road surface, involving such factors as cross slope, grooves and variations, and rutting, or other longitudinal and transverse departures from a desired road profile, determine how much material must be removed from and/or added to the road surface in order to restore or obtain the desired profile, the economic importance of accurate profile measurements should be obvious.

A particular problem in making such measurements from a moving vehicle is that of establishing spatial references to form the basis of the measurements made by the vehicle. The path and attitude of the vehicle as it moves along the road will be influenced by various forms of interaction between the vehicle and its environment. Firstly, its wheels will be rolling over the surface being measured, and will be linked to the remainder of the vehicle by a spring suspension. Secondly, the vehicle will be subject to lateral and longitudinal acceleration resulting from changes in vehicle direction and attitude, which accelerations may be indistinguishable from gravitationally generated forces occasioned by the cross-slope and grade which it is desired to measure.

U.S. Pat. No. 3,151,235 issued on Sept. 29, 1964 to B. D. Greenshields discloses a vehicle equipped for the making of a number of measurements in respect of a highway along which the vehicle is driven. The measurements are displayed on instruments arranged on a console which is recorded photographically at intervals to provide a permanent record of the instrument data, together with a view of the road ahead of the vehicle. The instruments provided include an artificial horizon device 32 and a gyroscope compass 36, the former being intended to provide means by which readings of road grade and side slope (cross slope) may be taken, which the latter provides for direction readings. U.S. Pat. No. 3,983,746 issued Oct. 5, 1976 to Phillips et al also discloses a road measuring vehicle utilizing a pitch and roll gyro to establish grade and side slope references. Whilst the use of gyroscopic devices at first sight appears to bypass the the problems associated with spurious readings generated by accelerations to which the vehicle is subject from causes other than gravity, in practice this independence turns out to be illusory in the case of the artificial horizon device. Such devices are subject to random drift, for which correction must be made if the device is to provide a sufficiently stable reference for measurements in more than the very short term. Unfortunately, conventional methods for correcting for drift and establishing an initial reference are themselves subject to error due to spurious accelerations, since they correct drift by use of a gravitational reference. Typically, the gyroscope is erected into a predetermined position relative to a vertical reference axis by roll and pitch torquers, and deviation from this axis is detected by, for example, level sensitive switches which activate the torquers as necessary to maintain the predetermined position. The problems associated with errors in the vertical reference due to lateral and longitudinal vehicle accelerations are recognized in the art, and means are usually provided enabling the erection system to be disabled during accelerations sufficient to produce significant spurious erection. In vehicles such as aircraft, where such accelerations will be of limited duration and absent for much of the time, the system works well since drift should not accumulate to unacceptable levels and plenty of opportunity is available for correction. Somewhat similar principles have also been applied in railroad track recording vehicles, as discussed for example in U.S. Pat. No. 1,837,609 issued Dec. 27, 1929 to Carter. Unfortunately, in a road vehicle, the conditions for such a system to operate properly may not always exist. Many roads are characterized by extensive and complex lateral and vertical curvature resulting in generation of a complex series of accelerations which may be confused with gravitational forces, and it is also difficult to drive a road vehicle without fluctuations in speed which also generate accelerations which may influence erection. In consequence, conventional erection systems do not work well in road vehicles, being susceptible to errors either through excessive accumulated drift if the erection system is disabled too much of the time, or significant erection errors if it is not disabled enough of the time.

Another possible approach to this problem is to utilize rate gyros rather than displacement gyros as discussed above. Since such gyros sense rate of change of pitch and roll (or grade and cross slope), they may be used in conjunction with conventional accelerometers which react both to vehicle accelerations and to gravitational components in order to discriminate between wanted and spurious signals. Unfortunately, similar factors to those which cause problems with the erection of displacement gyros cause problems in selecting suitable strapping for rate gyros, resulting in insufficient sensitivity or excessive displacement of the gyros and fragility of the mechanism.

We have now found that it is possible to utilize a pitch and roll displacement gyro to generate adequately stable grade and cross-slope references for road measurement purposes by applying corrections for spurious erection caused by non-gravitationally induced accelerations, the corrections being generated using acceleration data derived from independently collected displacement data. Thus the primary cause of non-gravitational lateral acceleration of a vehicle is centripetal acceleration during a change of direction. If the direction of travel of the vehicle is continuously monitored, as by a directional gyro, the rate of change of direction in conjunction with the change in longitudinal displacement and hence the resulting lateral acceleration of the vehicle can be calculated. Likewise, if the longitudinal displacement of the vehicle is continuously monitored, the velocity and acceleration of the vehicle can be derived. As disclosed by the Greenshields patent, longitudinal and directional displacement data is amongst the data normally collected by a fully equipped road measurement vehicle. Acceleration data derived therefrom will not be affected by gravitational acceleration.

In its broadest aspect, the invention provides an artificial horizon device comprising a pitch and roll displacement gyroscope, an erection system for erecting the gyroscope relative to a gravitational reference, means for measuring changes of angular displacement of the device in a horizontal plane, means for calculating from said measured changes the centripetal acceleration of the device in said plane, and means calculating therefrom the cumulative magnitude of spurious erection resulting from said acceleration to provide a correction to be applied to a roll displacement output of said displacement gyroscope.

Using corrections so derived, it is possible to operate the gyro in erection mode under conditions of lateral and/or longitudinal acceleration which would otherwise invalidate their readings by spurious erection, and thus to reduce the periods during which erection need be disabled to a point at which excessive drift during such periods ceases to be a problem under normally encountered road conditions.

Further aspects of the invention will become apparent from the following description of a preferred embodiment of the invention with reference to the accompanying drawings, in which.

Figure 1:
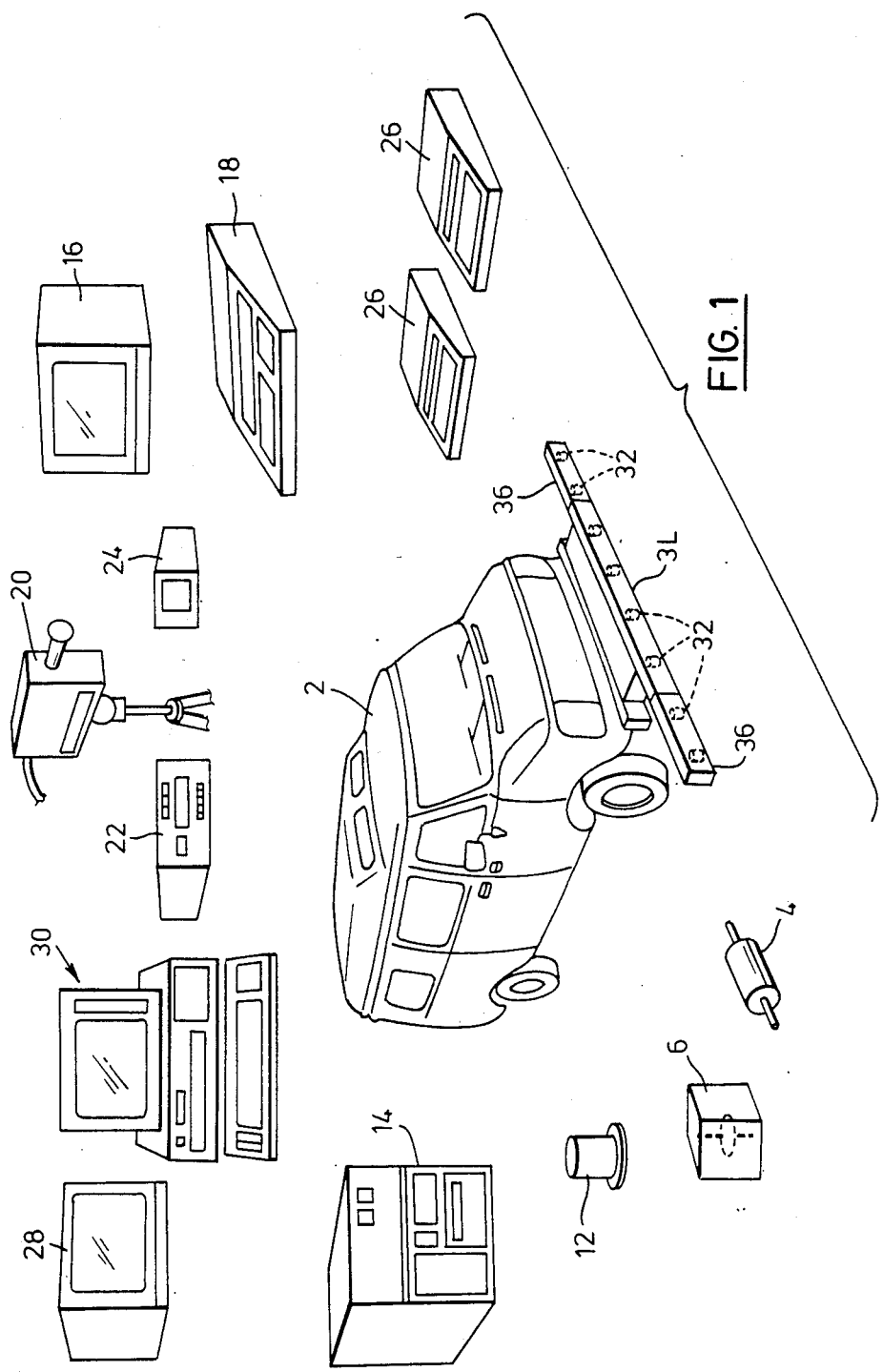
FIG. 1 is an explanatory view of a vehicle incorporating the invention, various portions of the equipment contained by the vehicle being shown externally for purposes of illustration.

Referring first to FIG. 1, a highway survey vehicle 2 contains a distance measuring instrument (DMI) 4 which provides tachometer pulses for units of distance travelled by the vehicle, a gyro package 6 containing a pitch and roll gyro 8 (see FIG. 2) and a directional gyro 10 (see FIG. 2), a ride accelerometer 12, a main computer and data storage unit 14 with an associated monitor 16 and keyboard 18, a video logging camera 20, a video recorder 22, a video monitor 24, and two surface distress rating keyboards (raters) 26 which enable operators to key in to the computer on a real time basis their visual assessments of the surface condition of the highway. An additional monitor 28 is provided at an engineering work station provided with a personal computer 30. It will be understood that this equipment enables the vehicle to gather much the same type of data as could be gathered by the Greenshields vehicle except that some of the data is digitized and stored by a mass storage means, typically a magnetic tape recorder in the computer 14 rather than being recorded photographically direct from gauges and counters. As compared to Greenshields, more extensive information as to road profile is gathered by a series of height measuring (vertical range finder) devices 32 mounted along the underside of a horizontal cross beam 34 mounted at the front of the vehicle and fold-out lateral extensions 36 of that beam. The devices 32 may for example be ultrasonic range finding devices such as those available from Polaroid Corporation, directed downwardly towards the road. With such a series of range finding devices, it is possible to measure deformations of the road surface in the lateral direction, such as rutting.

Figure 2:
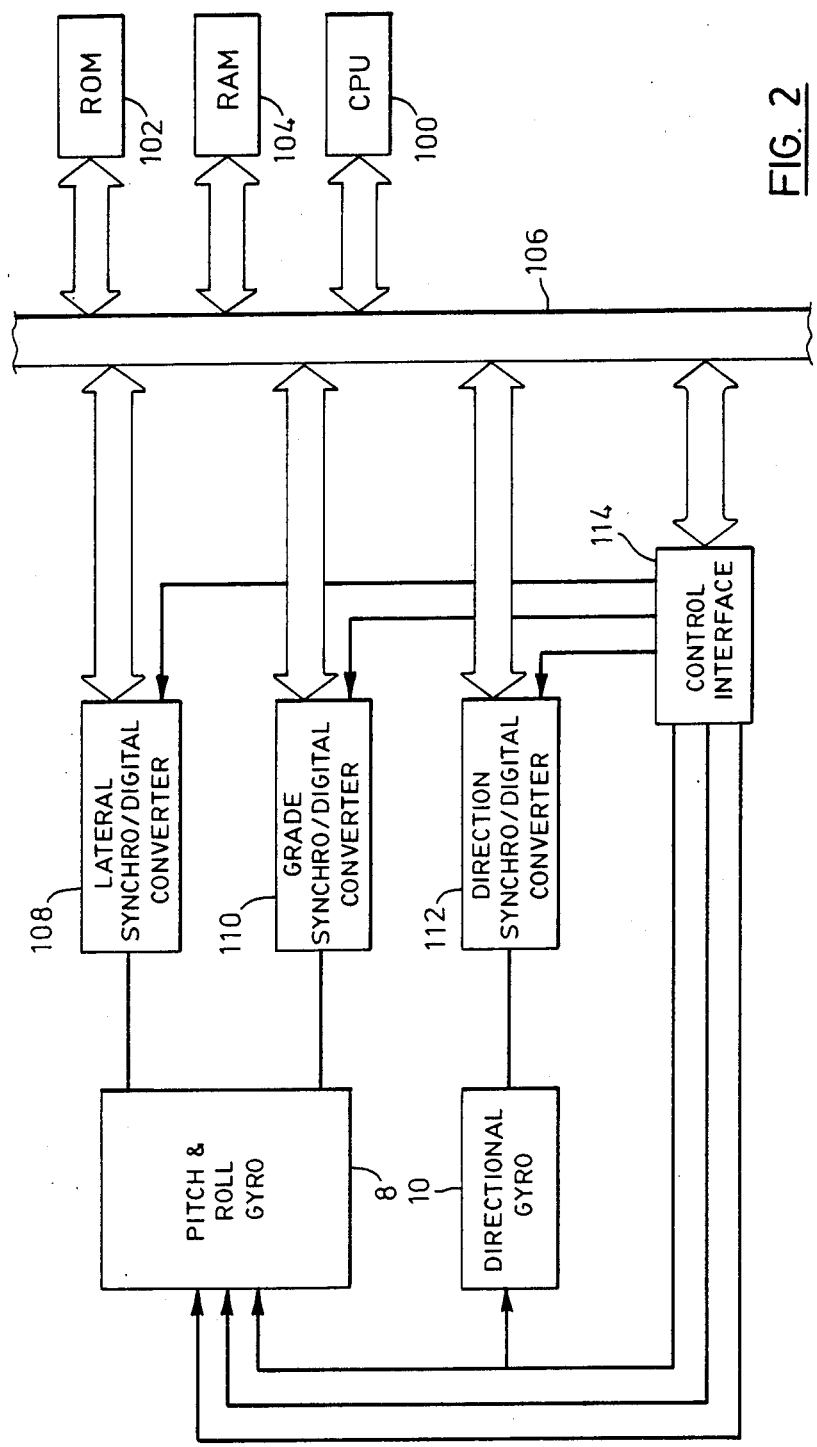
FIG. 2 is a block diagram illustrating relevant portions of the electronic equipment of the vehicle.

Certain portions of the computer 14 and its peripherals having particular relevance to the present invention are shown in FIG. 2. The computer comprises a central processing unit (CPU) 100, together with associated read only memory (ROM) 102, random access memory (RAM) 104, an address and data bus 106, and peripherals which include, as well as conventional support chips for the CPU, provision for interfacing to various of the units described with reference to FIG. 1, including interfaces to the pitch and roll and directional gyros 8 and 10. Specifically, the pitch and roll outputs of gyro 8 and the directional output of gyro 10 are provided with synchro to digital converters 108, 110 and 112, which sample and digitize the outputs and transfer the digitized samples to the bus 106 under control of an interface 114 which receives control signals from the bus 106. The interface 114 also transmits signals to the pitch and roll gyros controlling their erection. Typically the signals include a fast erect signal, used to erect the gyros rapidly during initialization, and individual pitch and roll erection control signals which enable or disable automatic erection in pitch and roll respectively, the erecting torquers being under control, typically, of electrolytic level sensing switches. A suitable instrument for use as the gyro 8 is the model VG-204D displacement gyroscope from Jet Electronics & Technology Inc., and a full description of the erection function is to be found in the "Theory of Operation" section of the instruction manual supplied with the instrument under part No. TP-251. A suitable directional gyro 10 is that supplied by Collins under model No. 332E-4.

It will be appreciated that the devices 32 have a fixed relationship to the cross beam 34 and its extension 36. Thus all height measurements will reference the road surface level to the cross beam, i.e. the position and profile of the road is sensed relative to the vehicle. In order to obtain really useful data, as in other forms of road profile measurement which make measurements with reference to a moving vehicle, it is necessary to sense the position of the vehicle relative to direction and level datums. Both the Greenshields and Phillips et al patents disclose the use of displacement type roll and pitch gyros for establishing a reference plane, but both patents are silent as to the problems in maintaining the stability of such references in a road vehicle environment, in which continually varying accelerations of various origins can result in erection errors and/or excessive drift. We have found that this problem can be largely overcome, as discussed further below.

Figure 3:
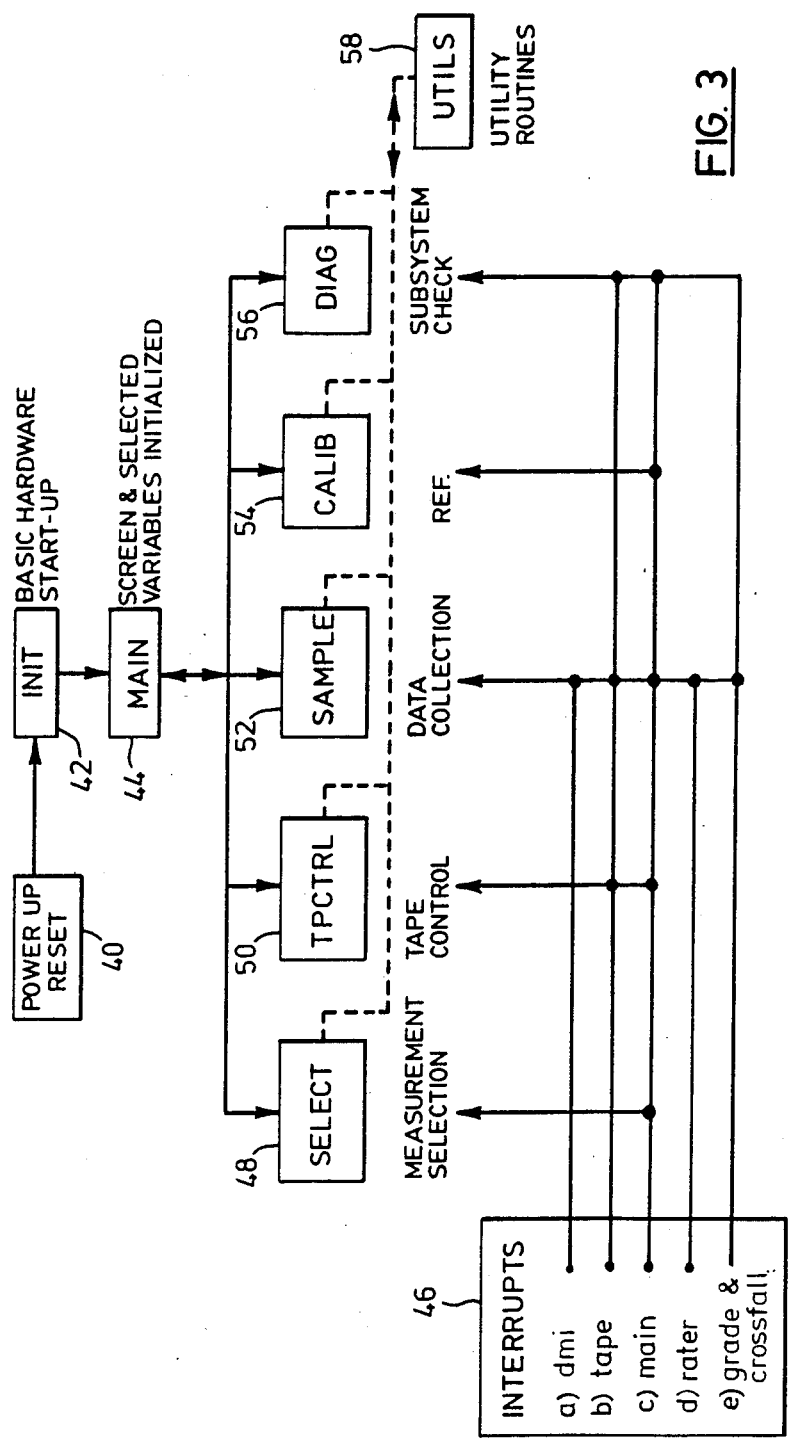
FIG. 3 is a structural outline of the control software employed in association with the equipment.

Data is collected from the various input devices and transducers by the computer 14 and stored on tape under control of a program outlined in FIG. 3 and summarized further below under headings corresponding to the various blocks identified by number in FIG. 3. For simplicity, items relating to certain equipment unrelated to the invention have been omitted.

42. INIT initialize CPU
set up interrupt vectors
initialize peripherals:
    RAM
    serial input/output devices (SIOs)
    parallel input/output devices (PIOs)
    counters and timers (CTC)
    video display unit (Monitors 16)

44. MAIN clear video display
activate main keyboard 18
activate tape drive
put up sign on message on display
set default options
erect gyros 8 and 10
display main menu
    branch to appropriate routine as selected

48. SELECT display options (defaults to reverse video)
update option settings as requested by input

50. TPCTRL display tape menu
    accept tape command and execute

52. SAMPLE display data collection screen according to selected
    options
get DMI calibration number
initialize variables
    raters, if selected
    tape buffer
display vehicle heading, when selected
get distance to be loaded or zero distance, when selected
get distance count direction when selected
display starting distance
get interval between sampling stations
after START key, initialize DMI
    clear elapsed time
    initialize calculation of rater data if selected
    check error codes
    check tape status
    initialize tape or exit
(main scan) clear speed counter
trigger a speed sample
wait for station, display distance
    update accelerometer
    offset
    get speed reading
(at station) get current distance travelled
calculate direction gyro erection
get direction data if selected
put data to tape buffer if necessary
display current station
calculate and display average speed
read pitch/roll gyros
    calculate curve radius if selected
    check for gyro drift
    warning
fire and read rangefinder sensors in sequence
output rater data, if selected
output curve reading, if selected
output station information to tape
return to main scan

54. CALIB display raw DMI counts, update calibration as necessary

56. DIAG display diagnostic menu get selection and execute
(switch gyros, fire sensors, exercise tape, display
basic ride reading, display software versions)

58. UTILS collection of routines available for all modules to call other utility routines involving mathematics and number conversion

Figure 4:
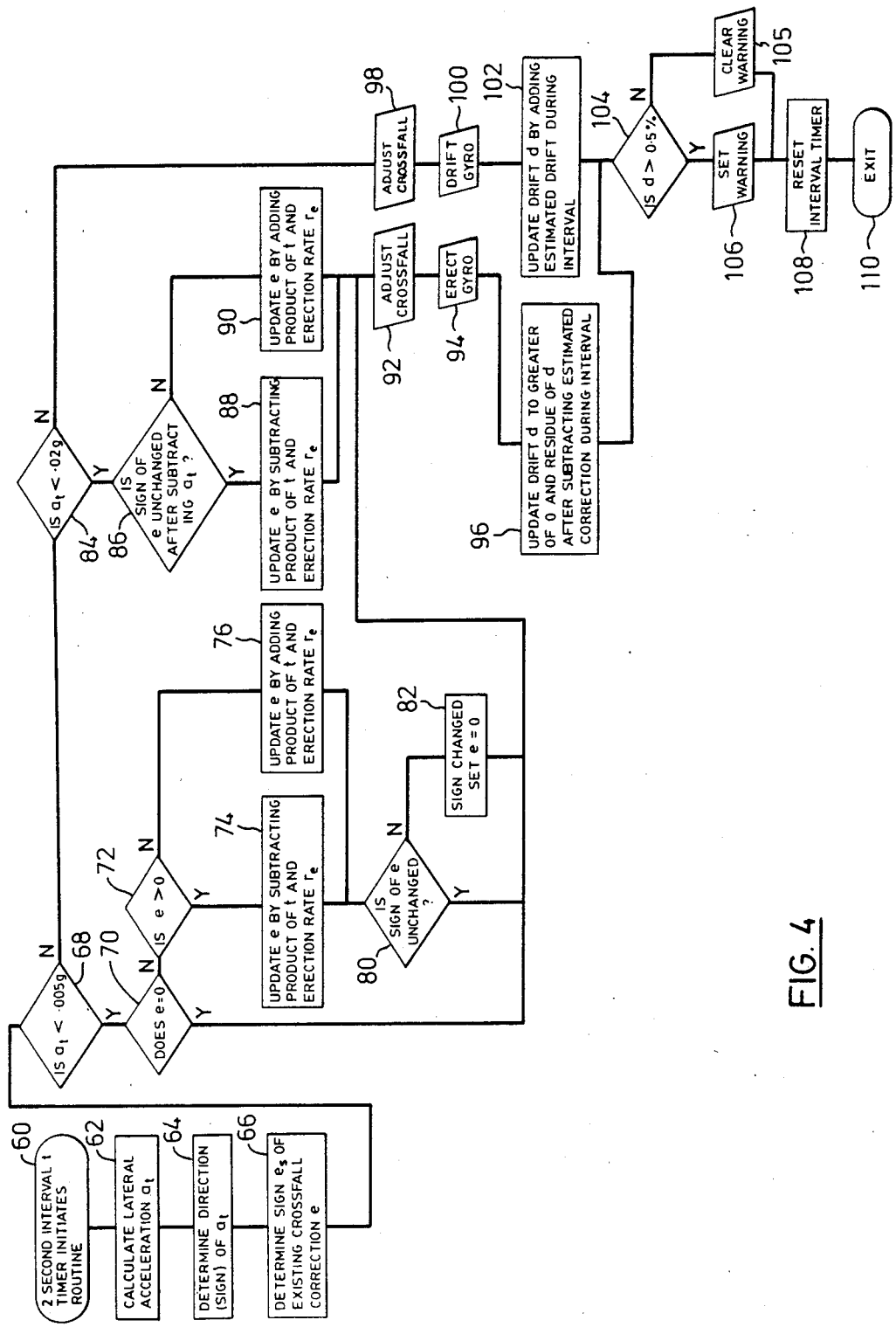
FIG. 4 is a flow diagram summarizing the functions and structure of relevant portions of this software, specifically the crossfall interrupt service routine.

46. INTERRUPTS (a) dmi (every meter or millimile)
    adjust distance
    if station event, get elapsed time
    update direction sample counter
    reset sample distance counter
    update direction gyro sample counter (4 meters/millimiles) if 1 meter or millimile before direction gyro event,
    initiate all range finder
    transducers if direction gyro event,
    read direction gyro
    calculate weighted heading angle
    reset counter
(b) tape (when commanded)
    read input character
(c) main keyboard (as keys pressed)
    determine if keypad or command key
    store data if keypad
    set command flag if command
(d) rater (as keys pressed)
    read key from rater 1 or rater 2
(e) grade and cross fall (every 2 secs)
    calculate correction applied to data from pitch and roll gyro
    set warning flag if drift excessive FIG. 4 is a flow chart illustrating in more detail part of the service routine associated with interrupt 46(g), grade and cross slope. The routine is initiated at 60 by a two second timing routine set up during initialization of the system. The lateral acceleration acting on the vehicle is then calculated. Since transverse accelerometers cannot distinguish between true lateral components and gravitational inputs due to cross-fall of the highway, super-elevation on curves, and leaning of the vehicle due to uneven loading, and super-elevation, in particular may cancel or even reverse the lateral component, it is preferred to derive the lateral acceleration by calculation from measured changes in vehicle direction. By monitoring the vehicle direction, as by monitoring the output of the directional gyro 10, and the distance travelled by the vehicle, its velocity V and turning radius R may readily be calculated, and are in fact calculated as wanted data by the program set forth above. The transverse acceleration of the vehicle is thus $V^2/R$, and is readily calculated in step 62 of the routine. The sign of the acceleration is then determined at step 64, turning radius and acceleration to left and right being allotted opposite signs so as to distinguish between them. It will be understood that other forms of input could be used to provide data for determining the lateral acceleration, particularly since no high degree of accuracy is required, such as directional data from a magnetic compass; however the method described is reliable and utilizes data already available on board the vehicle.

In the next step 66, there is determined the sign (i.e. direction, left or right) $e_s$ of an existing cross fall (roll) correction e applied to the roll output signal from the gyro 8. The magnitude of the calculated acceleration is then tested at step 68 to determine whether it falls below a predetermined lower acceleration threshold typically 0.005 g, this threshold being selected as the level at which errors due to lateral acceleration exceed the resolution of the system. Lower levels of acceleration can be ignored since the errors they produce are not significant. In the event that the calculation does not exceed the lower threshold, the magnitude of the error correction e is tested at step 70; if it is zero, the routine jumps to step 92, considered further below. If it is not zero, then the sign of the existing correction is tested at step 72. Should the existing correction be positive, it is then updated at step 74 by subtracting the calculated erection which has occurred during the preceding two second interval i.e. the product of the interval t and the erection rate $r_e$, and should the existing correction be negative, it is updated in a similar manner at step 76 by adding the calculated erection. The sign of the correction e is then again tested at step 80, and if it has changed, i.e. passed through zero, the correction is set to zero at step 82 because its magnitude is insignificant. The routine then again jumps to step 92.

In the event that the calculated lateral acceleration exceeds 0.005 g, then a first test is made at step 84 of whether it is less than, for example, 0.02 g, representing the threshold at which significant deviation can occur between the calculated correction for spurious erection due to lateral acceleration and the actual degree of spurious erection, bearing in mind that the erection rate of the gyroscope is subject to tolerances, and that the erection mechanism must also compensate for random drift. Assuming that the threshold is not exceeded, then in step 86 the calculated lateral acceleration is subtracted from the existing cross fall correction and the result test for change of sign, so as to determine the sense of the correction required, after which the correction is updated by steps 88 and 90, similar to steps 74 and 76, and the routine reaches step 92.

At step 92, the current cross fall measurement is corrected using the updated correction. Thereafter at step 94, the status of the roll erection control signal is checked and set true if not already so. In step 96, a register representing maximum possible accumulated drift based on the gyroscope specification is updated by subtracting from it the drift correction attributable to operation of the erection system and period t, on the basis that since the erection system is active, the drift has been corrected by that amount. If the accumulated drift changes sign as a result of this operation, it is set to zero on the basis that it has been fully correct. The routine then reaches a step 104 considered further below.

If step 84 shows the lateral acceleration to exceed 0.02 g, then no alteration of the correction e is attempted, and the existing value of correction is applied to the current cross fall measurement at step 98, whilst step 100 sets or maintains the erection control signal in an inactive condition. Step 102 updates the accumulated drift by adding the maximum drift which could have occurred during the period t, before reaching step 104.

Step 104 determines whether the maximum accumulated drift has reached a level which could significantly affect the cross fall measurement, for example 0.5° if this is the resolution of the system, and either sets a warning flag (step 106) that the cross fall measurement data is suspect, or clears the flag (step 104). Finally, the routine resets the interval timer at step 108 so as to restart a further 2 second interval t, and exits at 110.

The foregoing description does not include the portions of the routine related to applying corrections to the pitch signal from the gyroscope so as to obtain corrected measurements. These follow generally similar lines to those described above, except that the longitudinal acceleration of the vehicle is calculated using conventional formulae from the signals provided by the distance measuring instrument, and the less critical nature of the grade measurements required, and the fact that acceleration of the vehicle in a particular sense cannot be sustained for very long without either halting the vehicle or reaching an excessive speed, will usually render it unnecessary to apply a correction for false erection, thus enabling omission of the processing steps solely associated with this function. Fluctuating speed could however generate accelerations in excess of, for example, 0.02 g, which disable the erection system for a sufficient proportion of operation time for excessive drift to accumulate, and steps similar to the remaining processing steps are therefore provided for processing the pitch signal from the gyroscope 10.

In practice it has been found in testing to date that under normal road and driving conditions, using the above routine, the drift warnings provided by step 106 or its counterpart related to processing of the grade signal do not occur, since the system allows the erection system to be operative sufficiently to prevent excessive drift accumulating even on moderately winding or hilly roads or in traffic. Conditions which could give rise to warning indications would be sustained continuous curvature in one direction as on a closed circuit, or continuous acceleration and braking, sustained over a long distance, which the operator should obviously try to avoid.

Variations of the above technique are possible. As described, the computer, as well as maintaining what amounts to a model of the gyroscope erection system, and calculating corrections based on this model, uses true lateral acceleration data input to the computer to determine whether the erection system should be operative. An alternative approach would be to enable or disable the erection system in conventional manner according to whether the total lateral acceleration component acting on the gyro, including gravitational components, exceeded a certain threshold, and to monitor the conditions of the electrolytic switches or other equivalent means controlling the erection torquers so that the actual amount of erection applied could be calculated (within the tolerances in erection rate specified by the manufacturer of the gyroscope). The proportion of this erection attributable to lateral acceleration could then be calculated, and a correction applied accordingly.

We claim:

1. An artificial horizon device comprising a pitch and roll displacement gyroscope, an erection system for erecting the gyroscope relative to a gravitational reference, means for measuring changes of angular displacement of the device in a horizontal plane, means for calculating from said measured changes the centripetal acceleration of the device in said plane, and means calculating therefrom the cumulative magnitude of spurious erection resulting from said acceleration, to provide a correction to be applied to a roll displacement output of said displacement gyroscope.

2. A grade and cross fall reference device for a road vehicle comprising a pitch and roll displacement gyroscope, an erection system for erecting the gyroscope relative to a gravitational reference, means for measuring changes of angular direction of the vehicle in a horizontal plane, means for calculating from said measured changes the centripetal acceleration of the vehicle in said plane, and means calculating therefrom the cumulative magnitude of spurious erection resulting from said acceleration, to provide a correction to be applied to a roll displacement output of said displacement gyroscope to provide a cross fall reference.

3. A device according to claim 2, wherein the means for measuring changes of angular direction of the vehicle comprises a directional gyroscope and means for sampling the output of said directional gyroscope at known intervals.

4. A device according to claim 2, wherein means for sampling the output of the directional gyroscope is operated at predetermined increments of longitudinal displacement of the vehicle, and the means for calculating changes in centripetal acceleration comprise means for calculating the radius of turn of the vehicle, means for calculating the velocity of the vehicle, and means to derive said acceleration from said radius and said velocity.

5. A device according to claim 4, wherein the means for calculating the cumulative magnitude of the spurious erection comprises means to model the erection system based on data as to the erection rate of the gyroscope system.

6. A device according to claim 5, wherein the model is responsive only to accelerations sufficient to cause errors which are significant compared to the resolution of the system.

7. A device according to claim 5, including means to disable the erection system and the model responsive to accelerations exceeding a threshold at which the model is subject to errors which are significant compared to the resolution of the system, whereby the gyroscope means operates in drift mode.

8. A device according to claim 7, including means to determine the maximum possible cumulative drift to which the gyroscope means is subjected, and means to indicate when this drift exceeds a predetermined level at which it becomes significant relative to the resolution of the system.

9. A highway survey vehicle including a device according to claim 2 mounted to the body of the vehicle, a transverse beam mounted to the body of the vehicle, and a plurality of transversely spaced range finder devices mounted to the beam and downwardly directed, towards the highway surface, whereby to determine the lateral profile of the highway relative to a transverse reference datum established by the device.

* * * * *